W. L. JACKSON.
DRAIN OR SEWER PIPE.
APPLICATION FILED MAR. 9, 1909.
927,353.
Patented July 6, 1909.
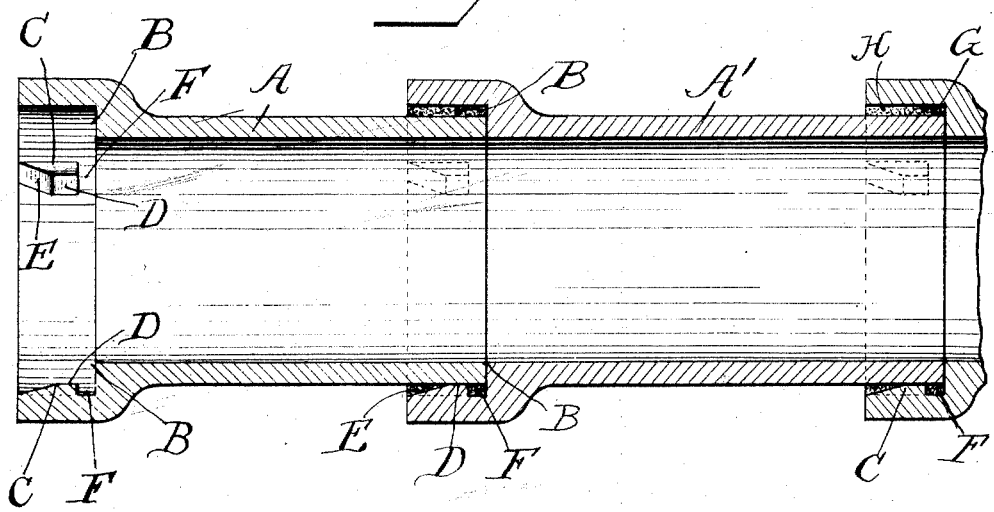
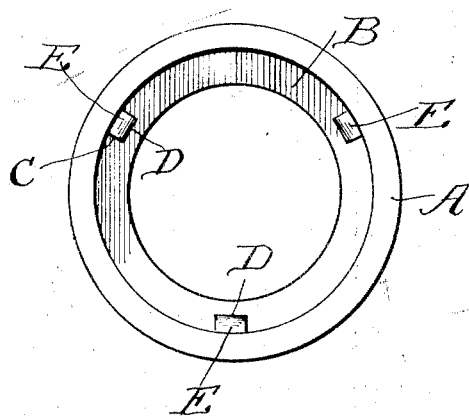

UNITED STATES PATENT OFFICE.

WILLIAM LEAF JACKSON, OF BROOKLAND, DISTRICT OF COLUMBIA.

DRAIN OR SEWER PIPE.

No. 927,353.    Specification of Letters Patent.    Patented July 6, 1909.

Application filed March 9, 1909. Serial No. 482,284.

*To all whom it may concern:*

Be it known that I, WILLIAM LEAF JACKSON, citizen of the United States, residing at Brookland, in the District of Columbia, have invented certain new and useful Improvements in Drain or Sewer Pipes, of which the following is a specification.

My invention relates to improvements in drain or sewer pipes, and particularly to an improved joint or coupling for such pipes. These pipes, which may be formed either of iron or terra-cotta, are commonly provided with a socket at one end into which the smaller end of another section is inserted when the pipe is placed in position for use. It is important that the end of one section should be so related to the end of the abutting section that no ridge or projection will be formed across the interior of the pipe to serve as an obstruction to the flow of water and to catch and retain any solid matter that may be carried by the water. Various means have been heretofore proposed for properly supporting the smaller or spigot end of such a pipe-section in position within the enlarged socket at the adjacent end of another section.

The object of my improvement is to so construct a pipe section that the spigot end of another section can be accurately and correctly placed in the socket and held in true alinement with the body of the section until the cement, lead or other fastening material has been introduced into the socket and around the spigot end of the pipe section.

Another object of my improvement is to so construct a pipe section that the bell mouthed portion will be provided with a centering lug provided with means for retaining the packing and cement around the spigot end of the pipe to firmly hold the same in the socket.

Referring to the accompanying drawings and to the letters of reference thereon, which form a part of this specification: Figure 1 is a longitudinal sectional view through a series of pipe sections constructed in a manner showing my improved centering device. Fig. 2 is an end elevation of one of the pipe sections embodying my improvements.

A represents the pipe section provided at one end with the bell mouthed socket B. Within the socket B and at the inner end thereof I arrange a series of inwardly extending lugs C. These lugs, which may be formed integral with the pipe section, are preferably made in the form shown—that is, each lug has a surface D extending parallel to the length of the pipe section and an inclined surface E extending from the aforesaid surface D to the edge of the socket B. The lugs C also are provided with a pocket F for retaining a packing of hemp G and for allowing the cement H to flow in around the spigot end of the pipe section to firmly hold the same in the socket. In the drawings I have shown the socket B as provided with three of these inwardly extending lugs C, arranged equidistant from each other; but any suitable number may be employed.

From the above description and the drawings it will be seen that when the spigot end of section A is inserted into the socket B of the section A' the inclined surface E of the lugs C will cause its inner end to be properly guided into position of alinement with the passage in the tube section A'. It will also be seen that I so arrange the lugs C that the spigot end is held from either lateral or vertical movement, but is adapted to be revolved or turned about the longitudinal axis in order that the two ends of the sections A, A' may be arranged in the best possible relation to each other. It frequently happens that these pipes are not perfectly true circles in cross-section, and by my construction the pipe setter is enabled to rotate the spigot end until the "flow line" of the sections is properly related to each other.

One of the great advantages incident to my improved construction is that behind the lugs C is formed a pocket F for the packing to slip into behind the surface D and to allow the cement to flow in around the spigot end of the pipe sections to firmly retain the same in position and to make a very rigid joint.

What I claim as my invention and desire to secure by Letters Patent is:—

1. A pipe section having at one end a socket of greater diameter than the body part and formed with tapering lugs integral therewith provided with means to retain a packing and cement around the spigot end of a pipe section.

2. A pipe section having at one end a socket of greater diameter than the body part and formed with tapering lugs integral with the socket wall, provided with a pocket to retain a packing and cement around the spigot end of a pipe section, and having inclined surfaces extending to the edge of the socket to enable a pipe section to be inserted into an adjacent socket and be guided by the inclined surfaces of the lugs into proper alinement and held against either vertical or lateral displacement, substantially as set forth.

In testimony whereof I affix my signature, in presence of two witnesses.

WILLIAM LEAF JACKSON.

Witnesses:
 ALBERT POPKINS,
 M. H. YATES.